(12) United States Patent
Heiligenmann

(10) Patent No.: US 10,285,559 B2
(45) Date of Patent: May 14, 2019

(54) WATER-CARRYING HOUSEHOLD APPLIANCE

(71) Applicant: BSH Hausgeräte GmbH, Munich (DE)

(72) Inventor: Caroline Heiligenmann, Böblingen (DE)

(73) Assignee: BSH Hausgeräte GmbH, Munich (DE)

( * ) Notice: Subject to any disclaimer, the term of this patent is extended or adjusted under 35 U.S.C. 154(b) by 214 days.

(21) Appl. No.: 15/310,590

(22) PCT Filed: Apr. 28, 2015

(86) PCT No.: PCT/EP2015/059204
§ 371 (c)(1),
(2) Date: Nov. 11, 2016

(87) PCT Pub. No.: WO2015/173010
PCT Pub. Date: Nov. 19, 2015

(65) Prior Publication Data
US 2017/0079501 A1 Mar. 23, 2017

(30) Foreign Application Priority Data
May 12, 2014 (DE) .................. 10 2014 208 861

(51) Int. Cl.
*A47L 15/00* (2006.01)
*A47L 15/42* (2006.01)
(Continued)

(52) U.S. Cl.
CPC ....... *A47L 15/0063* (2013.01); *A47L 15/0055* (2013.01); *A47L 15/4293* (2013.01);
(Continued)

(58) Field of Classification Search
CPC ............ A47L 15/0063; A47L 15/0055; A47L 15/4293; A47L 15/4418; A47L 15/449;
(Continued)

(56) References Cited

U.S. PATENT DOCUMENTS 8,323,419 B2 12/2012 Bastigkeit et al.
8,705,715 B2 8/2014 Park et al.
(Continued)

FOREIGN PATENT DOCUMENTS

CN 103634169 A 3/2014
DE 29622066 U1 4/1998
(Continued)

OTHER PUBLICATIONS

EP2630904A1—with machine translation (Year: 2013).*
(Continued)

*Primary Examiner* — Michael E Barr
*Assistant Examiner* — Tinsae B Ayalew
(74) *Attorney, Agent, or Firm* — Michael E. Tschupp; Andre Pallapies; Brandon G. Braun

(57) ABSTRACT

A water-carrying household appliance includes a receiving unit for receiving at least one signal from an external device coupled to the household appliance, a number of actuators for executing a plurality of programs, and a selector unit for selecting a program from the plurality of programs as a function of the at least one signal received. The actuators are controlled by a control unit so as to execute the selected program.

14 Claims, 3 Drawing Sheets

(51) Int. Cl.
*H04L 12/28* (2006.01)
*A47L 15/44* (2006.01)
*D06F 33/00* (2006.01)

(52) U.S. Cl.
CPC ......... *A47L 15/449* (2013.01); *A47L 15/4418* (2013.01); *H04L 12/2818* (2013.01); *H04L 12/2827* (2013.01); *A47L 2401/04* (2013.01); *A47L 2401/20* (2013.01); *A47L 2501/07* (2013.01); *A47L 2501/26* (2013.01); *D06F 33/00* (2013.01); *H04L 2012/285* (2013.01)

(58) Field of Classification Search
CPC ............ A47L 2401/04; A47L 2401/20; A47L 2501/07; A47L 2501/26; D06F 33/00; H04L 2012/285; H04L 12/2818; H04L 12/2827
USPC ...................................................... 134/56 D See application file for complete search history.

(56) References Cited

U.S. PATENT DOCUMENTS

| 2007/0169074 | A1* | 7/2007 | Koo | G06F 8/65 717/168 |
| 2008/0140862 | A1 | 6/2008 | Elston et al. | |
| 2012/0031432 | A1* | 2/2012 | Beaudet | A47L 15/0021 134/18 |
| 2012/0260683 | A1* | 10/2012 | Cheon | F25D 29/00 62/125 |
| 2013/0060359 | A1 | 3/2013 | Kim et al. | |

FOREIGN PATENT DOCUMENTS

EP 2630904 A1 8/2013
WO 2013104511 A1 7/2013

OTHER PUBLICATIONS

National Search Report DE 10 2014 208 861.5 dated Feb. 4, 2015.
International Search Report PCT/EP2015/059204 dated Jun. 24, 2015.
National Search Report CN 2015800246451 dated Nov. 1, 2018.

* cited by examiner

WATER-CARRYING HOUSEHOLD APPLIANCE

CROSS-REFERENCES TO RELATED APPLICATIONS

This application is the U.S. National Stage of International Application No. PCT/EP2015/059204, filed Apr. 28, 2015, which designated the United States and has been published as International Publication No. WO 2015/173010 and which claims the priority of German Patent Application, Serial No. 10 2014 208 861.5, filed May 12, 2014, pursuant to 35 U.S.C. 119(a)-(d).

BACKGROUND OF THE INVENTION

The invention relates to a water-carrying household appliance, for example a dishwasher or a household dishwasher, and to a method for operating a water-carrying household appliance.

Dishwashers have a dishwasher cavity which is provided to receive items to be washed. The dishwasher cavity can be closed by a door and comprises a receiving apparatus which can be closed by a lid for receiving at least one detergent, which is provided for cleaning the items to be washed during a wash program. In order to start a conventional dishwasher, initially a detergent, such as a powder or a tab for example, among other things is usually poured into the receiving apparatus. Subsequently, the lid of the receiving apparatus and then the door of the dishwasher are closed. Following this, a main switch of the dishwasher is actuated, a wash program and possibly also other options are selected, and the start button is then actuated.

BRIEF SUMMARY OF THE INVENTION

Against this background, one object of the present invention consists in creating an improved water-carrying household appliance.

Accordingly, a water-carrying household appliance is proposed which has a receiving unit for receiving at least one signal from an external device coupled to the household appliance, a number of actuators for executing a plurality of programs, a selector unit for selecting a program from the plurality of programs as a function of the at least one signal received, and a control unit which is equipped to control the actuators for executing the selected program.

The water-carrying household appliance is, for example, a dishwasher, in particular a household dishwasher. Examples of actuators of the dishwasher are valves, heating devices, pumps, fans, the motor for the water switch and the pump motor.

The signal contains an item of information which is indicative of the items to be washed arranged in the dishwasher cavity of the dishwasher. The signal can also comprise an item of information which indicates the soiling of the dishes to be expected.

For example, an intelligent refrigerator has information with regard to the food stored therein. The subsequent staining of the items to be washed can be deduced from said information. If the external device, that is to say the device arranged outside of the water-carrying household appliance, is a user terminal for example, such as a tablet or smartphone, via which the user can manage his or her shopping list, the signal which is indicative of the soiling of the items to be washed, for example the dishes, can also be generated from the shopping list.

According to one form of embodiment, the selector unit is equipped to select a program from the plurality of programs and a dosage of a detergent from a detergent allowance of the household appliance as a function of the at least one signal received.

According to a further form of embodiment, the control unit is equipped to control the actuators for executing the selected program with the selected dosage of the detergent.

According to a further form of embodiment, the control unit is equipped to select a program from the plurality of programs, a dosage of a detergent from the detergent allowance and a dosage of a washing liquor from a liquor reservoir of the household appliance as a function of the at least one signal received.

According to a further form of embodiment, the control unit is equipped to control the actuators for executing the selected program with the selected dosage of the detergent and the selected dosage of the washing liquor.

According to a further form of embodiment, the household appliance has a user interface coupled to the selector unit for outputting the program selected by the selector unit and for controlling the control unit.

According to a further form of embodiment, the selector unit is equipped to select a program from the plurality of programs as a function of the at least one signal received and a current point in time.

According to a further form of embodiment, the receiving unit is equipped to receive a plurality of signals from a plurality of external devices coupled to the household appliance.

According to a further form of embodiment, the selector unit is equipped to select a program from the plurality of programs as a function of the plurality of signals received.

According to a further form of embodiment, the external device coupled to the household appliance is a refrigeration appliance, a cooking appliance, an extractor hood, a camera or a user terminal.

The respective unit, for example the selector unit or the control unit, can be implemented as hardware or software. If implemented as hardware, the respective unit can be embodied as a device or as part of a device, for example as a computer or as a microprocessor. If implemented as software, the respective unit can be embodied as a computer program product, as a function, as a routine, as part of a program code or as an executable object.

Furthermore, a method for operating a household appliance, in particular a water-carrying household appliance, is proposed which has a number of actuators for executing a plurality of programs. The method includes the steps: Receiving at least one signal from an external device coupled to the household appliance, selecting a program from the plurality of programs as a function of the at least one signal received, and controlling the actuators such that the selected program is executed.

Furthermore, a computer program product is proposed which initiates the execution of the methods as described above on a program-controlled device.

A computer program product, such as e.g. a computer program means, can for example be provided or supplied as a storage medium, such as memory cards, USB sticks, CD-ROMs, DVDs or also in the form of files which can be downloaded from a server in a network. This can take place, for example, in a wireless communications network through the transmission of a corresponding file with the computer program product or the computer program means.

The forms of embodiment and features described for the proposed device apply accordingly to the proposed method.

Further possible implementations of the invention also comprise combinations—not explicitly cited—of features or forms of embodiment described above or below in respect of the exemplary embodiments. Here the person skilled in the art will also add individual aspects as improvements or amendments to the respective basic form of the invention.

BRIEF DESCRIPTION OF THE DRAWINGS

Further advantageous embodiments and aspects of the invention are the subject matter of the dependent claims as well as the exemplary embodiments of the invention described below. The invention is also described in greater detail on the basis of preferred forms of embodiment with reference to the attached figures.

DETAILED DESCRIPTION OF EXEMPLARY EMBODIMENTS OF THE PRESENT INVENTION

Figure 1:
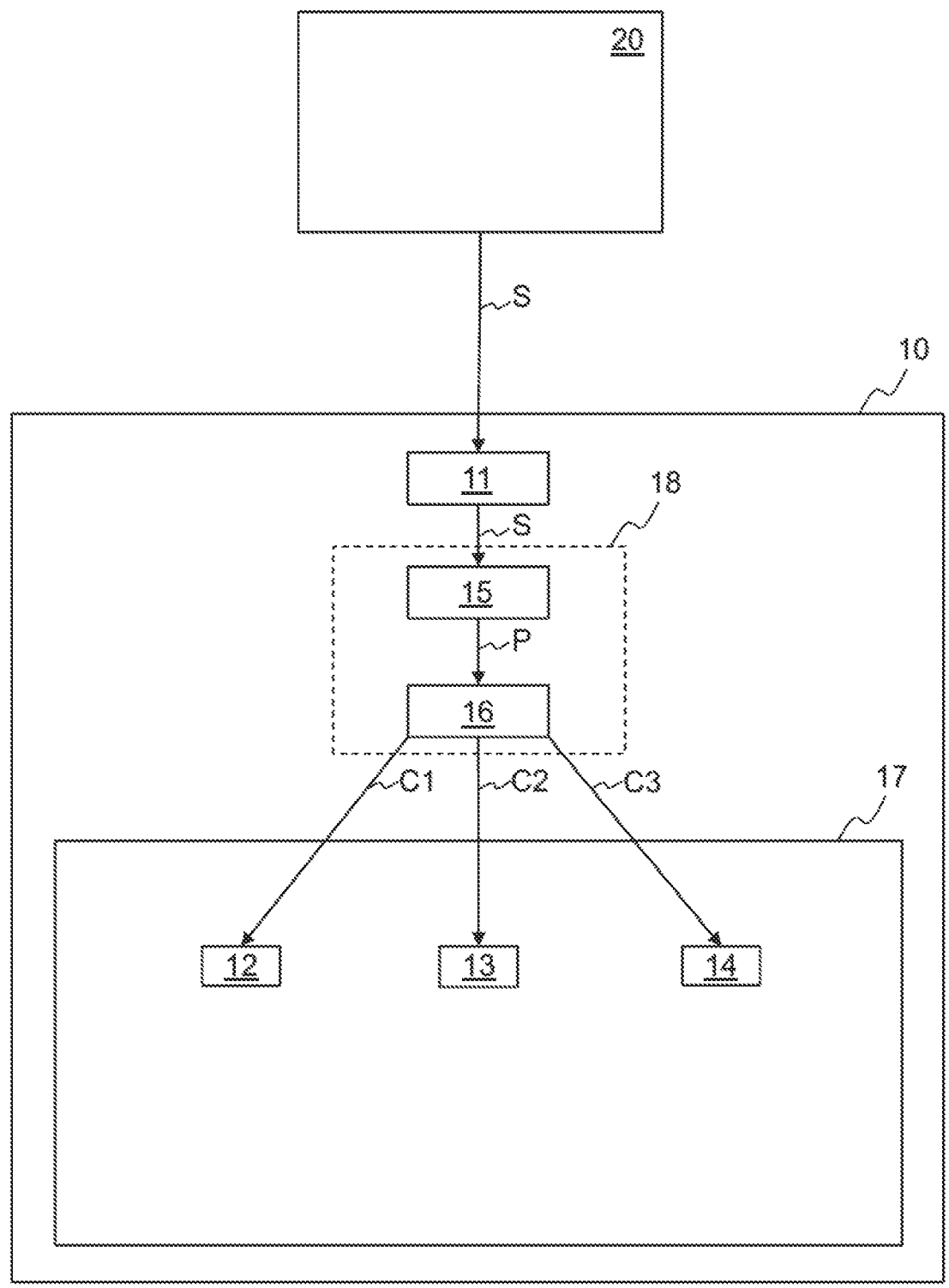
FIG. 1 shows a schematic view of a first form of embodiment of a dishwasher.

Elements which are the same or function the same have been provided with the same reference characters in the figures, unless specified otherwise.

FIG. 1 shows a schematic view of a first form of embodiment of a dishwasher 10.

The dishwasher 10 of FIG. 1 is an example of a water-carrying household appliance. Another example of a water-carrying household appliance is a washing machine.

The dishwasher 10 of FIG. 1 has a receiving unit 11, three actuators 12, 13, 14, a selector unit 15 and a control unit 16. The actuators 12, 14 can be, for example, valves, heating devices, pumps, fans, the motor of the water switch or the pump motor.

In the example of FIG. 1 the actuators 12-14 are arranged in the dishwasher cavity 17 of the dishwasher 10. The selector unit 15 and the control unit 16 are integrated into the appliance controller 18 of the dishwasher 10. The dishwasher 10 is coupled to an external device 20. Signals and/or messages can be transmitted via the coupling between the dishwasher 10 and the external device 20. The coupling between the dishwasher 10 and the external device 20 can be embodied in a wired or wireless manner Examples include a cable or a radio interface.

The external device 20 is, for example, a refrigeration appliance, such as a refrigerator, a cooking appliance, such as a cooker or an oven, an extractor hood, a camera or a user terminal. The external device 20 generates a signal S and transmits this to the dishwasher 10. The signal S contains an item of information which is indicative of the items to be washed arranged in the dishwasher cavity 17 of the dishwasher 10. For example, an intelligent refrigerator 20 has information with regard to the food stored therein. The subsequent staining of the items to be washed can be deduced from said information. If the external device 20 is a user terminal for example, such as a tablet or smartphone, via which the user can manage his or her shopping list, the signal S which is indicative of the soiling of the items to be washed, for example the dishes, can be generated from the shopping list.

The receiving unit 11 of the dishwasher 10 is equipped to receive the signal S from the external device 20. The selector unit 15 is coupled to the receiving unit 11 and receives the signal S from said receiving unit 11. Furthermore, the selector unit 15 is equipped to select a program P from the plurality of programs as a function of the signal S received. In other words, the soiling of the dishes to be expected is indicative of the signal S, wherein the signal S in turn is indicative of the selected program P.

The control unit 16 is equipped to control the actuators 12-14 for executing the selected program P. To this end, the control unit 16 preferably generates control signals C1-C3 for controlling the actuators 12-14.

For example, the selector unit 15 can also be equipped to select a program P from the plurality of programs and a dosage of a detergent from a detergent allowance of the household appliance 10 as a function of the at least one signal S received. Consequently, the signal S can not only indicate the program P to be selected, but also the dosage of the detergent to be used. In this case, the control unit 16 can then be equipped to control the actuators 12-14 for executing the selected program P with the selected dosage of the detergent.

In a further alternative, the selector unit 15 can also be equipped to select a program P from the plurality of programs, a dosage of the detergent and a dosage of a washing liquor from a liquor reservoir (not shown) of the household appliance 10 as a function of the signal S received. Consequently, the signal S then comprises an item of information with regard to the program to be selected, a dosage of the detergent and a dosage of the washing liquor. In this case, the control unit 16 can be equipped to control the actuators 12-14 for executing the selected program P with the selected dosage of the detergent and the selected dosage of the washing liquor.

Furthermore, the receiving unit 11 can also be equipped to receive a plurality of signals S from different external devices 20. For example, the receiving unit 11 can receive a first signal S from a tablet and a second signal S from a refrigerator (not shown).

In this case, the selector unit 15 can be equipped to select a program P from the plurality of programs as a function of a plurality of the signals S received.

Figure 2:
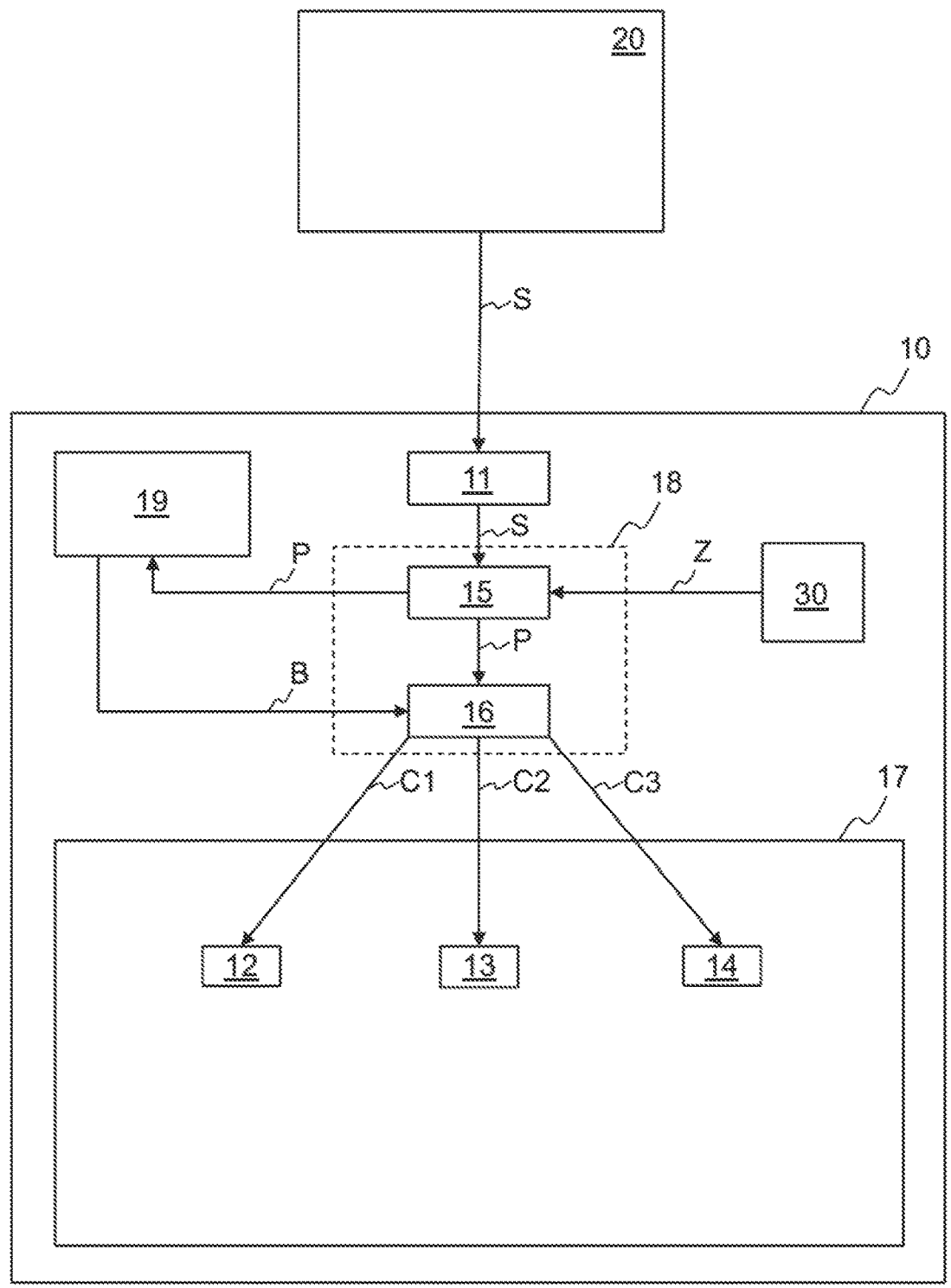
FIG. 2 shows a schematic view of a second form of embodiment of a dishwasher.

FIG. 2 shows a schematic view of a second form of embodiment of a dishwasher 10. The second form of embodiment of the dishwasher 10 in accordance with FIG. 2 has all of the features of the first form of embodiment in accordance with FIG. 1 and additionally a user interface 19 and a clock 30. The user interface 19 is equipped to output the program P selected by the selector unit 15 to the user. To this end the user interface 19 has a display and/or a loudspeaker, for example. The user can confirm or reject the selected program P via the user interface 19, for example. This generates commands B, which are transmitted from the user interface 19 to the appliance controller 18, as a function of the inputs made by the user on the user interface 19. By means of the commands B, the control unit 16 of the appliance controller 18 can be controlled by the user interface 19.

The clock 30 is equipped to provide a current time Z or a current point in time Z. The selector unit 15 of the dishwasher 10 can then be equipped to select the program P from the plurality of programs as a function of the at least one signal S received and the point in time Z provided by the clock 30.

Figure 3:
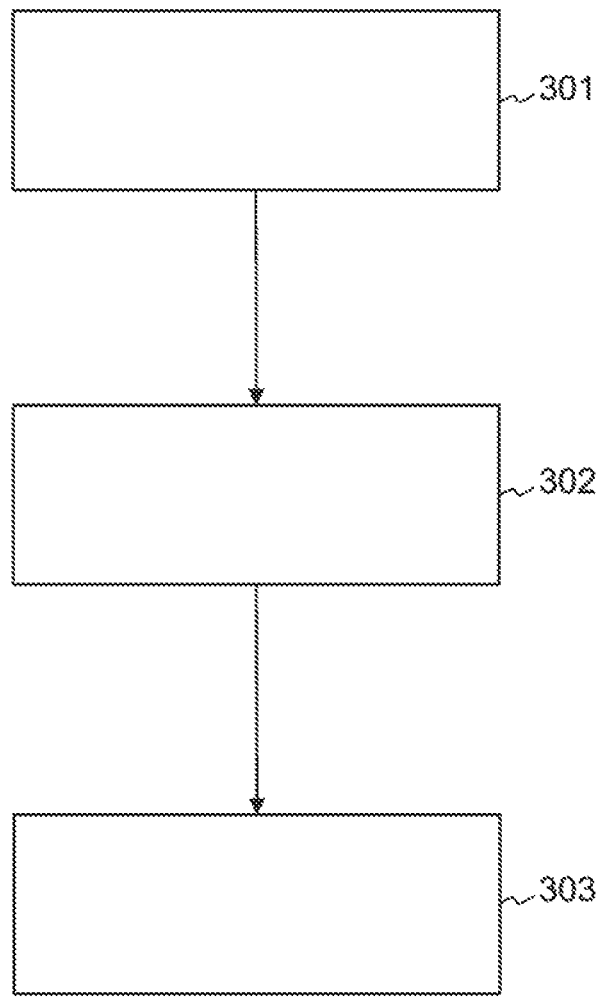
FIG. 3 shows a schematic flow chart of an exemplary embodiment of a method for operating a dishwasher.

FIG. 3 shows a schematic flow chart of an exemplary embodiment of a method for operating a dishwasher 10. The dishwasher 10 has a number of actuators 12-14 for executing a plurality of programs. The method in accordance with FIG. 3 comprises the following steps 301-303:

In step 301 at least one signal S is received by a device 20 coupled to the household appliance 10. The household appliance 10 and the external coupled device 20 are embodied as in the exemplary embodiments of FIG. 1 or 2, for example.

In step 302 a program P is selected from the plurality of programs as a function of the at least one signal S received.

In step 303 the actuators 12-14 of the household appliance 10 are controlled such that the selected program P is executed.

Although the present invention was described on the basis of exemplary embodiments, it can be modified in a variety of ways.

The invention claimed is:

1. A household dishwasher appliance, comprising:
    a receiving unit configured to receive at least one signal from an external device coupled to the household dishwasher appliance, wherein the at least one signal received from the external device contains an item of information which is indicative of items to be washed arranged in a dishwasher cavity of the household dishwater appliance, wherein the item of information includes an indication of an expected soiling of the items to be washed based on particular food items that will come into contact with the items to be washed, and wherein the receiving unit is configured to determine from the at least one signal received an expected soiling of the items to be washed based on the particular food item that will come into contact with the items to be washed,
    a number of actuators configured to execute a plurality of programs,
    a selector unit configured to select a program from the plurality of programs as a function of the at least one signal received, and
    a control unit configured to control the actuators for executing the selected program.

2. The household dishwasher appliance of claim 1, further comprising a detergent allowance, said selector unit configured to select a program from the plurality of programs and a dosage of a detergent from the detergent allowance as a function of the at least one signal received.

3. The household dishwasher appliance of claim 2, wherein the control unit is configured to control the actuators for executing the selected program with the selected dosage of the detergent.

4. The household dishwasher appliance of claim 1, further comprising a detergent allowance and a liquor reservoir, said selector unit being configured to select a program from the plurality of programs, a dosage of a detergent from the detergent allowance, and a dosage of a washing liquor from the liquor reservoir as a function of the at least one signal received.

5. The household dishwasher appliance of claim 4, wherein the control unit is configured to control the actuators for executing the selected program with the selected dosage of the detergent and the selected dosage of the washing liquor.

6. The household dishwasher appliance of claim 1, further comprising a user interface coupled to the selector unit for outputting the program selected by the selector unit and for controlling the control unit.

7. The household dishwasher appliance of claim 1, wherein the selector unit is configured to select a program from the plurality of programs as a function of the at least one signal received and a current point in time.

8. The household dishwasher appliance of claim 1, wherein the receiving unit is configured to receive a plurality of signals from a plurality of the external devices coupled to the household dishwasher appliance.

9. The household dishwasher appliance of claim 8, wherein the selector unit is configured to select a program from the plurality of programs as a function of the plurality of signals received.

10. The household dishwasher appliance of claim 1, wherein the external device coupled to the household dishwasher appliance comprises at least one of a refrigeration appliance, a cooking appliance, an extractor hood, a camera or a user terminal.

11. The household dishwasher appliance of claim 1, wherein the external device comprises an intelligent refrigerator that has information with regard to food stored therein.

12. The household dishwasher appliance of claim 11, wherein the particular food items comprise at least some of the food stored in the intelligent refrigerator.

13. The household dishwasher appliance of claim 1, wherein the external device comprises a user terminal, and the user terminal comprises one of a tablet or a smartphone, via which a user can manage a shopping list, and wherein the item of information contained in the at least one signal received is indicative of the expected soiling of the items to be washed based on the particular food items on the shopping list.

14. A method for operating a household dishwasher appliance, comprising:
    receiving at least one signal from an external device coupled to the household dishwasher appliance, wherein the at least one signal received from the external device contains an item of information which is indicative of items to be washed arranged in a dishwasher cavity of the household dishwasher appliance, and wherein the item of information includes an indication of an expected soiling of the items to be washed based on particular food items that will come into contact with the items to be washed,
    determining from the at least one signal received an expected soiling of the items to be washed based on the particular food items that will come into contact with the items to be washed,
    selecting a program from a plurality of programs as a function of the at least one signal received, and
    controlling actuators such that the selected program is executed.

* * * * *